US010685764B2

(12) United States Patent
Koenig et al.

(10) Patent No.: US 10,685,764 B2
(45) Date of Patent: Jun. 16, 2020

(54) BEND-FLEXIBLE ELECTRICAL CABLE

(71) Applicant: LEONI KABEL GMBH, Nuremberg (DE)

(72) Inventors: Guenter Koenig, Schwabach (DE); Erwin Koeppendoerfer, Schwabach (DE)

(73) Assignee: LEONI Kabel GmbH, Nuremberg (DE)

( * ) Notice: Subject to any disclaimer, the term of this patent is extended or adjusted under 35 U.S.C. 154(b) by 99 days.

(21) Appl. No.: 16/003,348

(22) Filed: Jun. 8, 2018

(65) Prior Publication Data
US 2018/0358150 A1 Dec. 13, 2018

(30) Foreign Application Priority Data

Jun. 9, 2017 (DE) .................. 10 2017 209 776

(51) Int. Cl.
| | |
|---|---|
| *H01B 7/04* | (2006.01) |
| *H01B 7/24* | (2006.01) |
| *H01B 7/00* | (2006.01) |
| *H01B 7/18* | (2006.01) |
| *B60L 53/18* | (2019.01) |

(52) U.S. Cl.
CPC ............... *H01B 7/04* (2013.01); *B60L 53/18* (2019.02); *H01B 7/0009* (2013.01); *H01B 7/1855* (2013.01); *H01B 7/24* (2013.01); *H01B 7/181* (2013.01)

(58) Field of Classification Search
CPC .......... H01B 7/04; H01B 7/24; H01B 7/0009; H01B 7/1855; H01B 7/181; B60L 53/18

USPC .................. 174/150 R, 108, 120 R
See application file for complete search history.

(56) References Cited

U.S. PATENT DOCUMENTS

| | | | | |
|---|---|---|---|---|
| 3,290,429 A | | 12/1966 | Prescott et al. | |
| 3,957,084 A | * | 5/1976 | Jung | B23Q 1/0009 138/122 |
| 4,216,645 A | * | 8/1980 | Andersen | G02B 6/4405 174/102 D |
| 4,236,509 A | * | 12/1980 | Takahashi | A61B 1/0055 138/122 |
| 4,367,967 A | * | 1/1983 | Albert, Jr. | G02B 6/4478 138/110 |
| 4,731,502 A | * | 3/1988 | Finamore | H01B 11/1869 174/74 R |
| 4,989,903 A | * | 2/1991 | McAllister | B63B 27/34 285/114 |
| 5,143,123 A | | 9/1992 | Richards et al. | |
| 2007/0084626 A1 | * | 4/2007 | Frank | H02G 11/00 174/135 |
| 2013/0213687 A1 | * | 8/2013 | Johnsen | H01B 7/188 174/113 R |
| 2013/0264112 A1 | | 10/2013 | Xu et al. | |

(Continued)

*Primary Examiner* — Dimary S Lopez Cruz
(74) *Attorney, Agent, or Firm* — Laurence A. Greenberg; Werner H. Stemer; Ralph E. Locher

(57) ABSTRACT

A flexible electrical cable is provided that extends in a longitudinal direction and contains a conductive core, with a reinforcing layer for limiting a bending radius mounted around the conductive core. The reinforcing layer is formed from at least one strand wound around the conductive core, which has winding sections with support surfaces. The support surfaces of adjacent winding sections are supported on each other to limit a bending radius.

13 Claims, 2 Drawing Sheets

(56) References Cited

U.S. PATENT DOCUMENTS

2015/0217654 A1    8/2015   Woo et al.
2016/0380417 A1   12/2016   Yamamoto

* cited by examiner

BEND-FLEXIBLE ELECTRICAL CABLE

BACKGROUND OF THE INVENTION

Field of the Invention

The invention relates to a flexible electrical cable extending in a longitudinal direction and having a conductive core.

Electrical cables are commonly used for supplying electrical power between two units. In many applications, flexibility is required, for example in connecting two units that may be moved relative to one another, such as machines or robots.

In the electric vehicle field, charging cables are used to charge a vehicle at a charging station. Such charging cables are often designed for transmitting high currents of more than 100 A. Due to the repeated charging process, charging cables are exposed to frequent bending stresses as well as weather-related loads. Electrical cables, especially the above-mentioned charging cables, often have control lines for transmitting control signals in addition to supply lines for transmitting electrical power.

The control lines typically have only a small cross-section, and are less robust under mechanical loads than the supply lines. The lines—both the control lines and the supply lines—are usually designed as flexible stranded conductors with a plurality of stranded individual wires. There is a particular risk that the lines may be mechanically damaged when they are bent at less than the minimum bending radius, leading for example to a strand break or a break in the line. Depending on circumstances, this may result in a malfunction of the cable.

BRIEF SUMMARY OF THE INVENTION

Proceeding from this situation, the present invention seeks to provide a flexible electrical cable with good bending fatigue strength and low risk of damage under reversed bending loads.

This objective is achieved, according to the invention, by a flexible electrical cable extending in a longitudinal direction and having a conductive core, with a reinforcing layer mounted around the conductive core for limiting the bending radius.

The reinforcing layer has at least one strand wound around the conductive core, and this strand has a plurality of winding sections. Preferably, exactly one strand is wound around the conductive core. The at least one strand is wound spirally around the conductive core in the manner of a banding. Preferably, the reinforcing layer is ultimately formed by this one strand. "Winding sections" here accordingly refer to the sections of the strand wound around the conductive core. The winding sections each have support surfaces that are capable of being displaced relative to each other when the cable is bent in the longitudinal direction. When the cable is bent, the support surfaces of adjacent winding sections bear on each other when the bending radius falls below a predetermined bending radius. As a result, the bending radius is limited to a minimal or minimum bending radius, for example, to a minimum bending radius preferably in the range from 20 cm to 50 cm. The minimum bending radius is set in such a way that damage to the conductive elements contained in the cable due to an excessively small bending radius is avoided by the special design of the reinforcing layer. The minimum bending radius therefore determines the (maximum) curvature of a circular path along which the cable may run.

By limiting the bending radius by means of the displaceable winding sections, bending below a minimum bending radius and resulting damage to the cable, in particular the control lines, may be reliably prevented. As a result, an increase in the life and operating time of the cable is achieved. Furthermore, within a permissible bending range, the flexibility of the cable is not limited. "Permissible bending range" here refers to a range between rectilinear deflection of the cable (no bending) and the minimum bending radius (in which the cable is bent so far that the support areas bear against one another).

According to a preferred embodiment, the flexible cable is designed as a charging cable for an electric motor-driven vehicle, in particular for an electric motor-driven passenger car. During charging, the charging cable connects a charging station to the vehicle. The charging cable is typically designed for transmitting electrical currents with a value greater than 50 A, in particular between 100 A and 400 A. The charging cable is preferably designed for charging by Mode 2, Mode 3 or Mode 4 according to the IEC 61851-1 standard. In particular, it is designed for direct current rapid charging of a passenger car by the "Mode 4" charging mode. The cable thus serves as a charging cable for rapid charging of a passenger car by means of a charging column that provides a charging current of up to 500 A. Furthermore, the conductive core usually has at least one control line, designed to transmit control signals for controlling the charging current and for starting and ending a charging process.

The winding sections are preferably designed to have profiles that overlap in the longitudinal direction. Accordingly, adjacent winding sections of the strand wound around the conductive core overlap. The strand wound around the conductive core is therefore designed as a profile strand with a non-round cross-sectional contour. The overlap of the winding sections is such as to form a closed reinforcing layer. Preferably, the overlap is chosen in such a way that the reinforcing layer is formed so that it is closed over all permissible bending ranges. Preferably, the profiles have a one-piece construction, and in particular a monolithic construction The profiles are made of a (single) material, in particular a conductive material.

It is expedient that the individual overlapping winding sections touch each other. As a result of the overlap of the profiles, electrical contact between the individual winding sections is achieved when using a conductive material, and as a result, the reinforcing layer further functions in the manner of an electromagnetic shield. In consequence, first, a shielding of the conductive core is achieved by electromagnetic interference fields occurring from outside the cable. Second, the cable has advantages in terms of electromagnetic compatibility (EMC). As a result, the cable does not interfere with devices located near the cable, for example mobile telephones or devices that are generally susceptible to interference by electromagnetic fields.

In addition, the closed reinforcing layer has advantages in terms of thermal conductivity, in that heat generated during operation of the cable, for example by a charging current, is dissipated to keep the cable cool.

According to a preferred and expedient embodiment, the winding sections each have an inner section and an outer section. "Inner section" here refers to a radially inward-directed section oriented toward a central axis of the cable. "Outer section" refers to a radially outward-directed section facing away from the central axis. Both the outer section and inner section have on both ends a support surface on which the winding sections, which are displaceable relative to each other, bear on each other when the cable is bent, so as to limit the bending radius of the cable. In connection with the overlapping configuration, each outer section of a winding section covers the inner section of an adjacent winding section.

The advantage of this embodiment is evident in the fact that when the cable is bent in different bending directions, the winding sections bear on the support surfaces in a defined way. "Bending direction" here generally refers to a deflection of the cable in a direction deviating from the longitudinal direction.

Preferably, the inner section of a first winding section is slidably supported on the outer section of a winding section that adjoins or follows the first winding section. As a result, displaceability of the individual winding sections relative to each other is achieved, while mutual electrical contact is also maintained.

Expediently, the support surfaces are formed as flat and in particular planar surfaces, oriented perpendicularly to the longitudinal direction. "Perpendicular orientation" here refers to a substantially perpendicular orientation, in which the support surfaces deviate, for example, from an exactly perpendicular orientation by up to an angle of +/−20°. Preferably, the support surfaces are oriented perpendicularly to the longitudinal direction. The longitudinal direction is defined by the cable in extended state, with no bending. The profiles, in particular the support surfaces, preferably have only surfaces that are oriented perpendicularly to each other, and which in particular merge into one another at the edges.

The advantage of this embodiment is that when the support surfaces bear on each other when the cable is bent, no lateral forces occur within the reinforcing layer, and thus within the cable. The mechanical forces that arise when the winding sections bear on one another cancel each other out. "Lateral forces" here preferably refer to mechanical forces that occur when the cable is bent when the support surfaces bear against one another and "deflect" the winding sections of the reinforcing layer perpendicular to the longitudinal direction. This configuration ensures that the support surfaces bear reliably and securely on one another, so that the bending radius is no less than the minimum bending radius in all bending directions.

According to a particularly preferred embodiment, the winding sections are formed in the manner of a Z profile. This embodiment has the advantage that the best possible compromise is achieved between a closed reinforcing layer and cable flexibility. Furthermore, a savings in materials is achieved due to this design of the winding sections.

Furthermore, in a preferred embodiment, the reinforcing layer comprises a metal, in particular a ferromagnetic metal such as steel. Specifically, the strand is formed of the metal. This development has the advantage that, first, the metal has a high material strength compared to, for example, plastics. As a result, the cable is further mechanically protected, for example, when it is driven over by a motor vehicle. Second, the ferromagnetic property of the metal realizes a shielding effect with regard to the EMC behavior of the cable.

The cable preferably has an outer jacket that directly surrounds the reinforcing layer. The outer jacket is preferably formed from a plastic, for example polyurethane (PUR). The outer jacket is applied for example by tube extrusion. The material of the outer jacket does not penetrate into the reinforcing layer and is not connected thereto, in order to ensure the desired mobility of the winding sections with respect to each other. As a result, the reinforcing layer is protected inside the cable, so that the user does not come into contact with the reinforcing layer.

Expediently, the conductive core has a plurality of conductive elements. In this case, "conductive elements" are understood to refer to supply wires for supplying and in particular for charging the electric motor-driven vehicle, and control lines for transmitting control signals, for example for regulating the charging current or starting and stopping the charging process. Typically, a plurality of supply wires (three, four or five) and a plurality of control lines (typically two) are furnished.

To protect the conductive elements from mechanical stress, in particular from friction of the displaceable winding sections when the cable is bent, the conductive core has an intermediate jacket surrounding it. The intermediate jacket is preferably formed from a plastic, for example polyurethane (PUR), and in particular is formed as an extruded jacket. The reinforcing layer preferably surrounds the intermediate jacket directly. The reinforcing layer is disposed between the intermediate jacket and the outer jacket, and preferably rests directly on both the intermediate jacket and the outer jacket.

According to a preferred embodiment, the strand is formed preferably from a flat band by a forming process, such as embossing or pressing, to form the desired profile of the winding strands. "Ribbon" here refers to a metal workpiece in the manner of a band with a rectangular profile. The desired Z-profile design may thus easily be achieved as a matter of manufacturing technology.

The flexible cable has a constant configuration in the longitudinal direction over its entire length; in particular, the reinforcing layer extends over the entire length of the cable.

BRIEF DESCRIPTION OF THE SEVERAL VIEWS OF THE DRAWING

Exemplary embodiments of the invention will be explained in greater detail with reference to the drawings. Thee drawings show the following, in part by highly simplified representations.

DESCRIPTION OF THE INVENTION

Figure 1A:
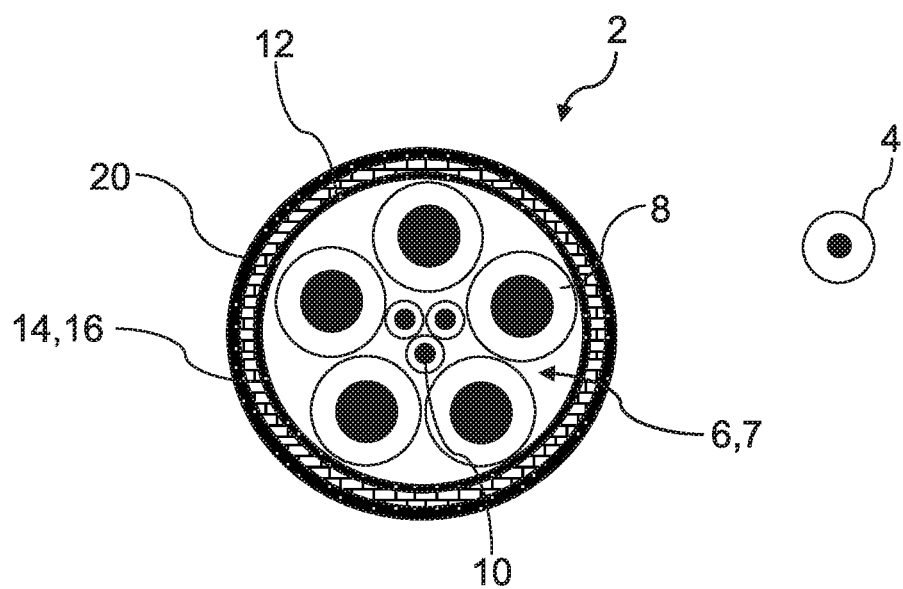
FIG. 1a a cross-sectional view of a flexible cable,
FIG. 1b a longitudinal sectional view of a flexible cable, and
FIG. 2 a roughly simplified representation of an electric motor-driven motor vehicle connected to a charging column for charging.

In the drawings, parts having the same effect are represented by the same reference numerals.

FIG. 1a shows a cross section through a flexible cable 2 for supplying two units that may be moved relative to one another. The cable 2 extends in a longitudinal direction 4 and has a conductive core 6. In the exemplary embodiment, the cable 2 is designed as a charging cable for electric motor-driven motor vehicles, in particular as a Mode 4 charging cable. For this purpose, the conductive core 6 has a plurality of electrically conductive elements 7; in the exemplary embodiment, these are five supply wires 8 and three control lines 10.

"Mode 4" generally denotes an operating mode for charging an electric motor-driven passenger car. Charging by the Mode 4 charging mode is effected by a direct current of up to 500 A, supplied to the car to be charged via the cable 2 by means of electrically conductive elements 7, and in particular by means of supply wires 10. In the exemplary embodiment, a three-wire configuration of a charging cable is shown. Three of the five supply wires 8 serve in this case as the (charging) current supply, one supply wire 8 serves as a neutral conductor and one supply wire 8 is designed as a grounding wire.

The control lines 10 serve to transmit control signals, for example to start or end a charging process. Control lines 10 of this kind preferably have a cross section that is smaller by a factor of 10 to 12 than the cross section of the supply wires 8. In the exemplary embodiment, the supply wires 8 have a cross section in the range of 2 mm$^2$ to 16 mm$^2$. In the exemplary embodiment, the control lines 10 have a cross section in the range of 0.5 mm$^2$ to 1 mm$^2$. In the exemplary embodiment, the conductive elements 7 have a sheathing made of a plastic such as polyvinyl chloride (PVC).

In the exemplary embodiment, the cable 2 also has an intermediate jacket 12, which is arranged peripherally around the conductive core 6 and likewise extends in the longitudinal direction 4.

Figure 1B:
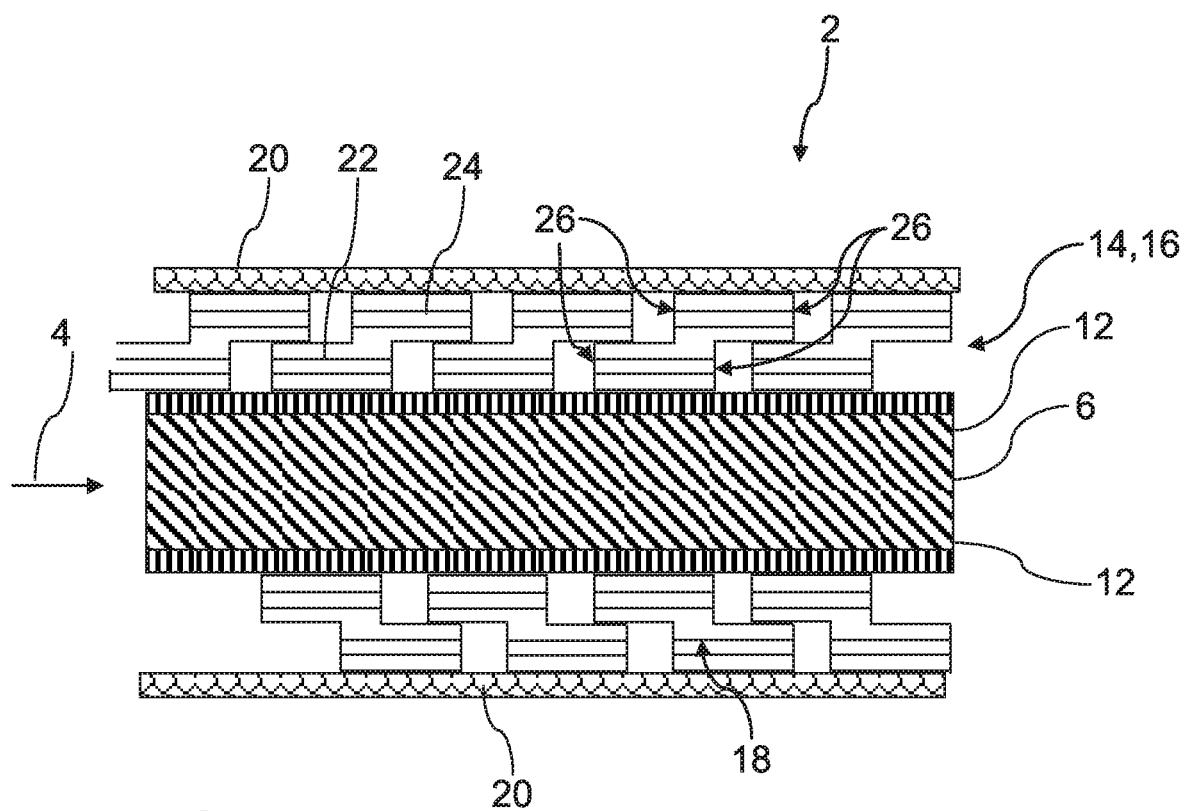

A reinforcing layer 14 is arranged peripherally around the intermediate jacket 12, which extends in the longitudinal direction 4 and is formed from a strand 16 wound around the conductive core 6 with winding sections 18 adjoining one another in the longitudinal direction 4 (see FIG. 1*b*). The reinforcing layer 14 is made of metal, in particular a ferromagnetic metal such as steel, in the exemplary embodiment. The strand 16 is a metal profile strand.

The strand 16 is formed from a flat band in the exemplary embodiment, by a forming process for shaping the desired profile of the winding sections 18. The strand 16 is formed by shaping processes, for example pre-embossing or pressing to shape the desired profile.

Furthermore, the cable 2 has an outer jacket 20 arranged peripherally around the reinforcing layer 18. The outer jacket 20 serves both to protect a user when handling the cable 2, for example when plugging the cable 2 into a car to be charged, and as a protective jacket for the cable against external influences, such as mechanical, thermal or other loads.

In FIG. 1*b*, the cable 2 is shown in a simplified partial longitudinal sectional view. For reasons of simplification, the conductive elements 7 of the conductive core 6 are not shown separately.

As already described, the reinforcing layer 14 arranged peripherally around the intermediate jacket 12 has a plurality of winding sections 18 that are displaceable relative to each other when the cable 2 is bent in the longitudinal direction 4. The winding sections 18 are preferably designed in one-piece form, in particular as one-piece and especially monolithic profiles; in the exemplary embodiment, they are each configured in the manner of a Z profile. Furthermore, the winding sections 18 are formed such that they overlap in the longitudinal direction 4 and abut each other to form a closed reinforcing layer 14. As a result, an electrical contact of the individual winding sections 18 with each other is achieved.

In the exemplary embodiment, the winding sections 18 each have an inner section 22 and an outer section 24. Both the inner section 22 and the outer section 24, viewed in the longitudinal direction 4, have a support surface 26 at both ends.

To form the reinforcing layer 18, the strand 16, which is preferably Z-shaped in cross section, is wound successively spirally around the conductive core 6, in the manner of a banding. Adjacent winding sections 18 of the strand 16 are arranged with overlap around the conductive core 6.

The reinforcing layer 18, in particular the winding sections 18, serve to provide mechanical protection of the cable 2, in particular with respect to a bending fatigue strength.

In other words: The reinforcing layer 14, and in particular in the exemplary embodiment, the winding sections 18 formed in the manner of a Z profile, are arranged around the conductive core 6 and thus inside the cable 2, so that they limit the bending movement of the cable 2 when the cable falls below a bending radius R, in particular a minimum bending radius.

For this purpose, the winding sections 18 are displaced in the longitudinal direction when the cable 2 is bent, and the outer section 24 of a winding section 18 slides over the inner section 22 of an adjacent winding section 18. In other words, the Z profiles push "into each other." As the bending radius R decreases, the winding sections 18 move further into one another until the support surfaces 26 of adjacent winding sections 18 contact and bear on one another. "Overbending" of the cable 2 is prevented due to the winding sections 18 bearing on one another, preventing a cable break, in particular a break of the control lines 10.

"Bending radius R" in the exemplary embodiment refers to the radius of a circular path that at least partially describes the bent cable 2.

Furthermore, the reinforcing layer 14 is due to being made in particular of a ferromagnetic metal, both as a shield against electromagnetic interference and also as protection from being driven over, for example, when a car drives over the cable 2, for example when maneuvering the car to a charging column prior to charging.

To avoid lateral forces and/or displacement of the winding sections 18 perpendicular to the longitudinal direction, the support surfaces 26 have flat surfaces and are oriented perpendicular to the longitudinal direction 4. As a result, forces that may occur are distributed only in the longitudinal direction 4.

Figure 2:
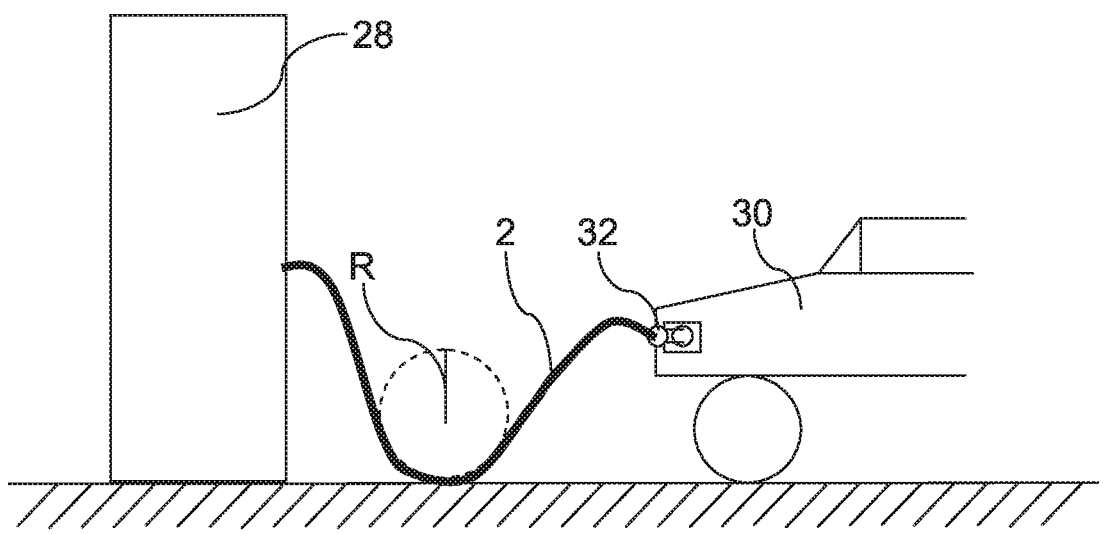

FIG. 2 shows a roughly simplified representation of an electric motor-driven passenger vehicle 30 connected to a charging column 28 for charging. For this purpose, the vehicle 30 is electrically connected to the charging column by means of the cable 2. By "electric motor-driven car" here is generally meant a purely electric motor-driven passenger car or a passenger car that has both a motor that operates in the manner of an internal combustion engine and a motor that operates in the manner of a purely electrically operated motor. Among the latter are, for example, plug-in hybrid vehicles.

In particular, in the case of a charging column 28 designed for charging in Mode 4 charging mode, the user at least connects the cable 2 irreversibly to the charging column 28. For connecting the cable 2 with the car to be charged, the cable 2 has, in the exemplary embodiment, a plug 32 at one end, and in particular has a type 2 or type 3 plug in the case of charging by the Mode 4 charging mode.

Charging cables for electric or hybrid motor vehicles with electric traction motors typically have standardized charging plugs. Relevant standards on this point are currently IEC 62196-2 (type 2 and type 3 plugs), SAE J1772 or IEC 62196-2 (type 1 plug). The cable 2 designed as a charging cable is therefore provided, at least at one end, with a standardized charging plug, for example in accordance with the abovementioned or (future) comparable standards.

The invention claimed is:

1. A flexible electrical cable extending in a longitudinal direction, the flexible electrical cable comprising:
   a conductive core; and
   a reinforcing layer for limiting a bending radius of the cable and mounted around said conductive core, said reinforcing layer having a strand wound around said conductive core with winding sections that each have support surfaces, and said winding sections are capable of displacement relative to one another when the flexible electrical cable is bent in the longitudinal direction, until adjacent winding sections bear on one another to limit the bending radius of the cable.

2. The flexible electrical cable according to claim 1, wherein the flexible electrical cable is a charging cable for an electric motor-driven vehicle and for electrical currents greater than 50 amps.

3. The flexible electrical cable according to claim 1, wherein said winding sections are formed as profiles and overlap and abut each other in the longitudinal direction, so as to form a closed reinforcing layer.

4. The flexible electrical cable according to claim 1, wherein said winding sections each of the inner section and the outer section have an inner section and an outer section, and each have a support surface at both ends in the longitudinal direction.

5. The flexible electrical cable according to claim 4, wherein said inner section of a first winding section of said winding sections is slidably supported on said outer section of a subsequent winding section of said winding sections.

6. The flexible electrical cable according to claim 1, wherein said support surfaces are formed as flat surfaces oriented perpendicular to the longitudinal direction.

7. The flexible electrical cable according to claim 1, wherein said winding sections are each formed in a manner of a Z profile.

8. The flexible electrical cable according to claim 1, wherein said reinforcing layer contains a metal.

9. The flexible electrical cable according to claim 8, wherein said reinforcing layer has a ferromagnetic metal.

10. The flexible electrical cable according to claim 1, wherein said reinforcing layer is surrounded by an outer jacket.

11. The flexible electrical cable according to claim 1, wherein said conductive core contains a plurality of electrical conductive elements surrounded by an intermediate jacket.

12. The flexible electrical cable according to claim 1, wherein said strand is formed from a flat band by a forming process for shaping a desired profile of said winding sections.

13. The flexible electrical cable according to claim 1, wherein:
- only one strand is spirally wounded around said conductive core as a banding;
- said strand is a one-piece profile strand;
- said winding sections are formed with a Z profile as seen in a longitudinal-sectional view along said longitudinal direction;
- said winding sections each have an inner section and an outer section, such that in the case when the cable is bent said outer section slides over said inner section of an adjacent winding section until said support surfaces of adjacent winding sections contact and bear on one another.

* * * * *